(12) United States Patent
Gerthe

(10) Patent No.: US 6,539,085 B2
(45) Date of Patent: *Mar. 25, 2003

(54) AUTOMATIC PHONE LINE RE-ALLOCATION

(75) Inventor: John David Gerthe, Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,387

(22) Filed: Oct. 26, 1999

(65) Prior Publication Data

US 2002/0085695 A1 Jul. 4, 2002

(51) Int. Cl.$^7$ ................................................. H04M 9/00
(52) U.S. Cl. .............. 379/168; 379/167.01; 379/167.11
(58) Field of Search ......................... 379/90.01, 106.08, 379/93.09, 93.11, 156, 168, 167, 387, 167.01, 167.11

(56) References Cited

U.S. PATENT DOCUMENTS

| | | | | |
|---|---|---|---|---|
| 5,422,939 A | * | 6/1995 | Kramer et al. | |
| 5,787,155 A | * | 7/1998 | Luna | |
| 5,809,111 A | * | 9/1998 | Matthews | |
| 5,898,756 A | * | 4/1999 | Manning et al. | |
| 6,219,411 B1 | * | 4/2001 | Peters et al. | 379/171 |
| 6,310,940 B1 | * | 10/2001 | Ratz | |

OTHER PUBLICATIONS

Harry Newton, 1998, Newton's Telecom Dictionary, p. 645.*

* cited by examiner

Primary Examiner—Curtis Kuntz
Assistant Examiner—Barry W Taylor

(57) ABSTRACT

For single line telephone service, let red/green denote a pair that is connected to the central office, and yellow/black denote an unused pair, but which also appears at the connections to the subscribers equipment. Any computer or other device that is to be interruptible by an ordinary handset is connected to red/green through a phone service re-allocation circuit that is also connected to, and that monitors, yellow/black. An extension allowed to cause an interrupt is connected to yellow/black. For RJ-11 connections an adapter routes the yellow/black (in the wall) over to the terminals normally used for red/green. An off hook condition of the interrupting equipment connected to the adapter now serves as part of a signal to the re-allocation circuit. Upon a signal, the re-allocation circuit terminates the access of the interruptible equipment to the red/green pair, and bridges the red/green pair to the yellow/black pair instead. The signal can range from a simple off hook condition to the further detection of dialing a certain digit or sequence of digits (e.g., 9 or 911), and may involve supplying a false dial tone to the interrupting equipment and the stored re-dialing those digits to prevent an uninformed user from thinking "the line is dead". If the interruptible equipment is on hook, the re-allocation circuit automatically disconnects it from the central office red/green, bridges that red/green to yellow/black, and then monitors the interruptible equipment for off hook.

8 Claims, 2 Drawing Sheets

US 6,539,085 B2

AUTOMATIC PHONE LINE RE-ALLOCATION

BACKGROUND OF THE INVENTION

The use of computers for Internet and other networking purposes at locations, especially private residences, served by a single analog telephone line is increasing dramatically. Many subscribers to local phone service do not find it economical or otherwise convenient to order a second line for computer use. And while times when junior is "surfing the net" at length and tying up the family phone may merely be occasions for family discord, there are situations where it would be appropriate for another person in the residence to be able to make a telephone call from an extension on that line, even without the assistance or cooperation of the person using the computer.

That said, there are employers who send a computer home with an employee, either for mutual convenience or for regularly scheduled work conducted from home. These circumstances can often tie up a phone line for extended periods of time. However, such sessions rarely operate at full capacity for the entire time, and there are often extended period of inactivity during a session. Since custom software is often involved, it could be arranged that upon a signal the session be suspended in a graceful manner and the telephone connection dropped for a while. During that time the phone line could be used for other calls. Then the original connection is re-established and the session resumed. There is also the technique of VoIP (Voice over IP), which allows the insertion into a session of packets of digitized voice, directed to some destination that can deal with them and perhaps send similar packets back in response. Those things being possible, there would be some interest and utility in a device that would perform the automatic sharing of the telephone line.

Finally, the computer referred to above, given that it connects to the subscriber loop with a modem, is essentially just another handset as far as other telephone equipment is concerned. What can be done to it can be done to another handset. That is, if the computer mentioned above were replaced with a regular phone, then we have alluded to a way where under definable circumstances other handsets in the same residence can have "priority" over that phone, at least for making outgoing calls at the expense of an unconditional ending of an existing call.

SUMMARY OF THE INVENTION

For many years it has been common in the construction of new homes and some commercial buildings to use station wire that has more than one pair within the sheath of a cable. For a great number of subscribers, this means that, unless an actual second subscriber line is brought to the demarcation box [holding the terminals where the line belongs to the local telephone company (telco) on the central office side and to the subscriber on the other], at least one pair inside the subscriber's building is unused, and that it goes everywhere that there is an RJ-11 or other connector to allow an additional extension (handset or other device). Let red/green denote the pair that is connected to the central office, and yellow/black denote an unused pair, but which also appears at the modular or other style connection to the subscribers equipment. Any computer or other device that is to be interruptible by an ordinary handset (or other item of the subscriber's equipment) is connected to red/green through a phone service re-allocation circuit that is also connected to, and that monitors, yellow/black.

Any extension or other item of phone gear that is to be able to cause such an interrupt of the equipment nominally connected to red/green is connected to yellow/black. In the case where that interrupting extension or other phone gear is normally connected to red/green via a modular jack, it may be shifted over to black/yellow via a simple adapter that plugs into that modular jack, and which itself is then plugged into. Internally, it simply routes the yellow/black (in the wall) over to the terminals normally used for red/green by a device that plugs into the adapter. An off hook condition of the interrupting equipment connected to the adapter now serves as a signal to the re-allocation circuit.

Upon being properly signaled to do so, the re-allocation circuit (gracefully or perhaps not) terminates the access of the computer or other interruptible equipment to the red/green pair, ensures that the central office ends the call, and then bridges the red/green pair to the yellow/black pair instead. This connects the extension or other equipment having priority for outgoing calls to the subscriber loop, so that an outgoing call can be made. The notion of "properly signaled to do so" mentioned above can range from a simple off hook condition to the further detection of dialing a certain digit or sequence of digits (e.g., 9 or 911). In the more sophisticated cases it may be desirable for the re-allocation circuit to not only terminate the pre-existing phone call, but also supply a false dial tone to the interrupting equipment to prevent an uninformed user from thinking "the line is dead" and being deflected from his purpose (dialing 911 for an emergency) as a result. In such a case the re-allocation circuit might store the dialed digits, and when real dial tone is obtained from the central office, re-dial them and then do the bridging of yellow/black to red/green.

And, of course, if the interruptible equipment is not using red/green (the on hook condition), then the re-allocation circuit automatically disconnects the central office red/green from that interruptible equipment, bridges red/green to yellow/black, and then monitors red/green from the interruptible equipment for the off hook condition. The preferred response to an off hook condition for the interruptible equipment is to wait for on hook for bridged yellow/black to red/green before undoing the bridge and proceeding with the new call for the interruptible equipment.

DESCRIPTION OF A PREFERRED EMBODIMENT

Figure 1:
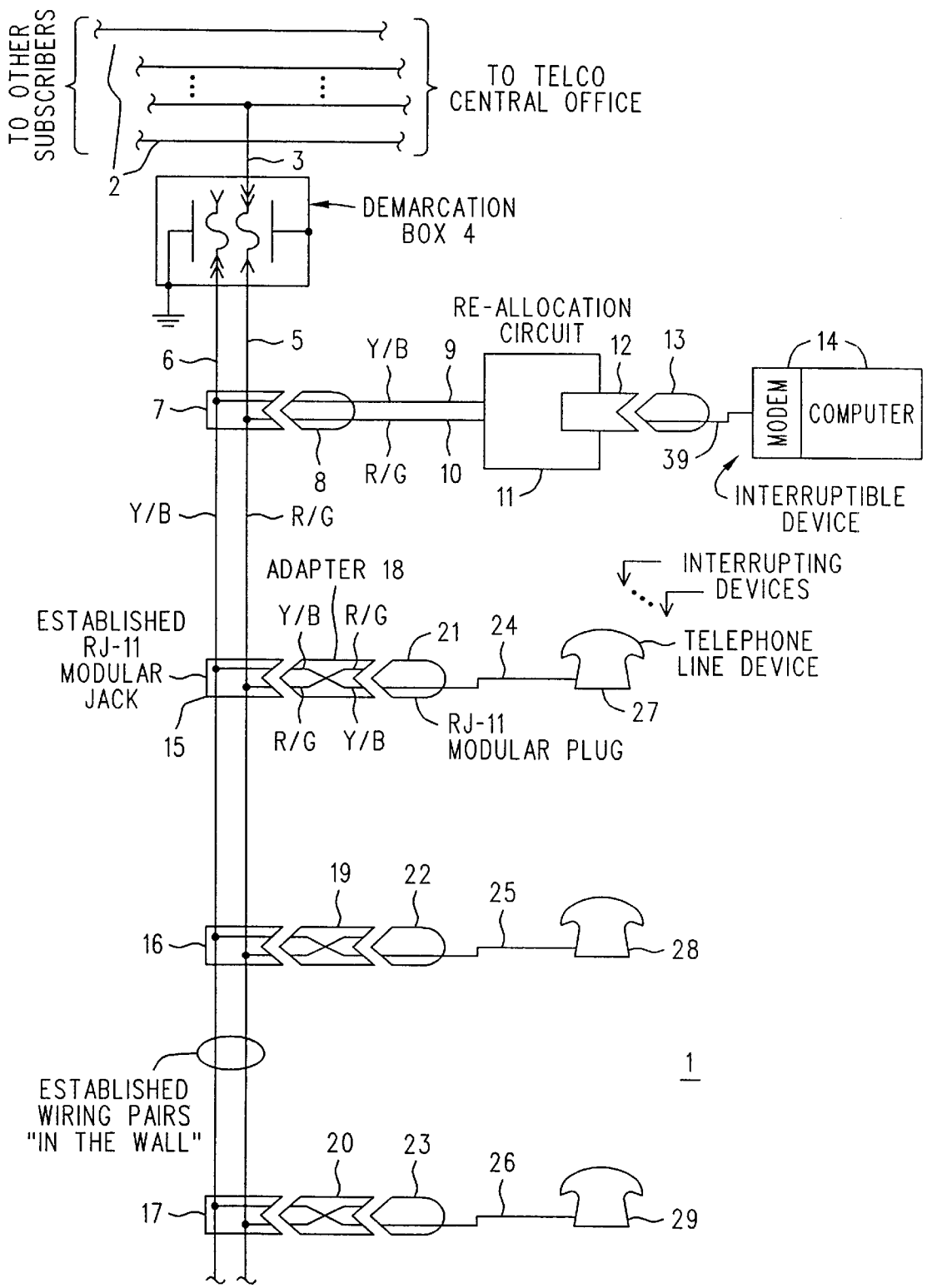
FIG. 1 is a simplified block diagram illustrating how telephones and other telephone-like devices may be interconnected using the invention so that one of them may be interrupted by the others.

Refer now to FIG. 1, wherein is shown a simplified block diagram 1 of a collection of telephones and telephone-like equipment that are all served by a single telephone line, and where one of these devices is automatically interruptible by the others.

To begin, notice the cable 2. This a multi-pair cable that connects subscriber to the phone company's central office. Individual conductors within pairs are not shown; a line in the cable denotes a pair of conductors. In a residential or small business setting cable 2 is what is buried in the ground along people's back fences, or carried aloft on telephone poles. Our example will be developed as if it were a residence, and it will be understood that our remarks apply equally well in any installation having multiple pairs within the subscriber's site but connected to just one pair in cable 2.

Pair 3 represents the "just one pair" mentioned in the previous sentence. It is sometimes called the drop, and spans the distance from the cable 2 (where it is typically connected thereto at a pedestal, which is not shown) to the demarcation box 4, which is typically located at a convenient spot on the outside of the residence. The demarcation box 4 contains what is essentially a terminal strip protected by fuses and lightening arresters. On the drop side the cabling belongs to the telco, whereas it belongs to the subscriber on the other. And lest it be overlooked, please note that drop 3 is for a single pair, which emerges from the other side of the demarcation box 4 as red/green (R/Y) pair 5.

Pair 5 is accompanied by pair 6 (which has no drop), and possibly by other pairs (not shown). Pairs 5 and 6 represent the telephone wiring inside the residence or other building. It might be inside the walls, as is customary in dwellings, in conduit, or be just a cable secured to the structure with clamps. In any event, in most recent construction of the last three decades installers have generally used multi-pair cable, usually (although not always) in a sheath. That multi-pair cable (represented here by pairs 5 and 6, with the understanding that there might be more pairs) is routed to various places of connection where telephone and telephone-like equipment are expected to be connected. In the figure there are four such locations shown, with the understanding that there may be more. At each of those locations there is a connector, of which the modular style is now typical. For standard residential service and its small business equivalent that means an RJ-11 style connector. There certainly are other styles that might be used; some folks will recall the old four pin cube with the cable tacked onto the baseboard.

We will assume that the connectors (7, 15, 16, 17) are each populated by conductors of both pairs 5 and 6. Pair 5 is red/green (R/G) and pair 6 is yellow/black (Y/B). It will be appreciated that, while these colors are typical, and that their use has a definite meaning, it is entirely possible that in any given installation that different colors were used. We shall mean by R/G the pair that leaves the demarcation box 4 via drop 3 to be served by the central office. It is the primary pair that, at the time of phone service installation, was intended to be the phone line. The term Y/B shall refer to another (secondary) pair in the subscriber's wiring, which does not reach the central office, but which is available at the connectors 7, and 15–17. If the Y/B pair 6 is merely co-located with the R/B pair 5 and not already electrically attached to connectors 7 and 15–17, then such electrical attachment must be made at least at connector 7 and at any other connector whose associated telephone equipment is to posses the interrupt capability described below.

To continue, then, we suppose that there are a number of other telephone devices ("extension" phones) that are also connected to the R/G pair 5. These are indicated as being actual telephones 27, 28 and 29. It will readily be appreciated that while these telephone devices 27–29 might indeed be genuine telephones for people to talk on, they are not limited to that. Any or all of them might be a modem, intelligent burglar alarm that dials for the police, or some other apparatus besides a regular phone. One or more of these telephone devices 27–29 is to be able to interrupt another telephone device (not yet described, but it is 14) and claim the R/G pair 5 for its own use.

Ordinarily, and absent the interruption feature that is desired, each of telephone devices 27–29 is connected to the R/G pair 5 through a modular connector. We want them to be connected to the Y/B pair 6, instead. Accordingly, between each of the modular plugs 21–23 for devices 27–29 and the corresponding modular jacks 15–17 is an associated adapter 18–20. What this adapter does is connect the R/G pairs 24–26 on the jack side (from device 27–29) to the Y/B pair 6 on the plug side. Thus, when modular plugs 21–23 are mated with the jack sides of adapters 18–20 the telephone devices 27–29 are each electrically connected to Y/B pair 6. Telephone devices 27–29 would have regular phone service if Y/B pair 6 were connected by a drop to the central office, but alas, according to our assumptions it is not.

Now consider modular jack 7. Connected to it is a modular plug 8 populated with both an R/G pair 10 and a Y/B pair 9. Both jack 7 and plug 8 are standard unaltered units, and there is no intervening adapter, so R/G pair 10 is electrically connected to R/G pair 5, and Y/B pair 9 is electrically connected to Y/B pair 6. Pairs 9 and 10 connect at their other ends to a re-allocation circuit 11, about which we shall have more to say, in due course.

For now, please note that the re-allocation circuit has connected to it via modular jack 12 and mating plug 13 a modem-computer combination 14. For example, the computer might be of the PC (Personal Computer) variety, with a modem card mounted in an option I/O slot. In the example of the figure, the assumption is that the computer will have access to R/G pair 5 and be connected to some remote system via the telephone system, and that it will be that way for extended periods of time. A further, although not absolutely necessary, assumption, is that the software in the various systems involved tolerates the occasional loss of the telephone connection (an interrupted telephone call).

Simply put, it is the job of the re-allocation circuit 11 to interrupt a telephone connection between the modem-computer 14 and its remote interlocutor whenever a particular specified kind of event occurs. So, if all of telephone devices 14 and 27–29 were on hook, then the re-allocation circuit 11 would disconnect the R/G pair of jack 12 from R/G pair 10/5, and would instead bridge R/G pair 10/5 to Y/B pair 9/6. This would allow devices 27–29 to have telco supplied dial tone any time one of them were to go off hook, and allow incoming calls to reach their ringers. The on/off hook condition of modem/computer 14 is also monitored, and if the modem goes off hook while devices 27–29 remain on hook, then the Y/B to R/G bridging is stopped, and the R/G pair 10/5 is electrically connected to the modem so that it may dial. The re-allocation circuit 11 monitors Y/B pair 9/6 for an off hook condition, so that if during the computer's call one of the devices 27–29 goes off hook a decision can be made as to whether or not to interrupt that call.

Now, before considering the internal operation of the re-allocation circuit 11 in more detail, we should note that certain variations from what is shown in FIG. 1 are possible. Suppose that the device to be interrupted were indeed a computer, and not simply another telephone for people use. Also suppose that for some reason the modem were part of the re-allocation circuit; perhaps it and the re-allocation circuit are both part of some larger apparatus, which might be a file server that emulates a counterpart that exists at the other end of the computer's (14) phone call. In that case there might be a DB-25 connector between the re-allocation circuit and the computer. Or, the computer might be connected to the re-allocation circuit or its enclosing apparatus via a small network (coax, T-Base 10, or whatever). In any case, it is preferable (although not absolutely necessary), regardless of what the physical connection layer is, for there to be a network style protocol involved, as that is robust with regard to data integrity, and makes supporting dropped connections (i.e., the deliberate interruptions we seek) much easier.

Figure 2:
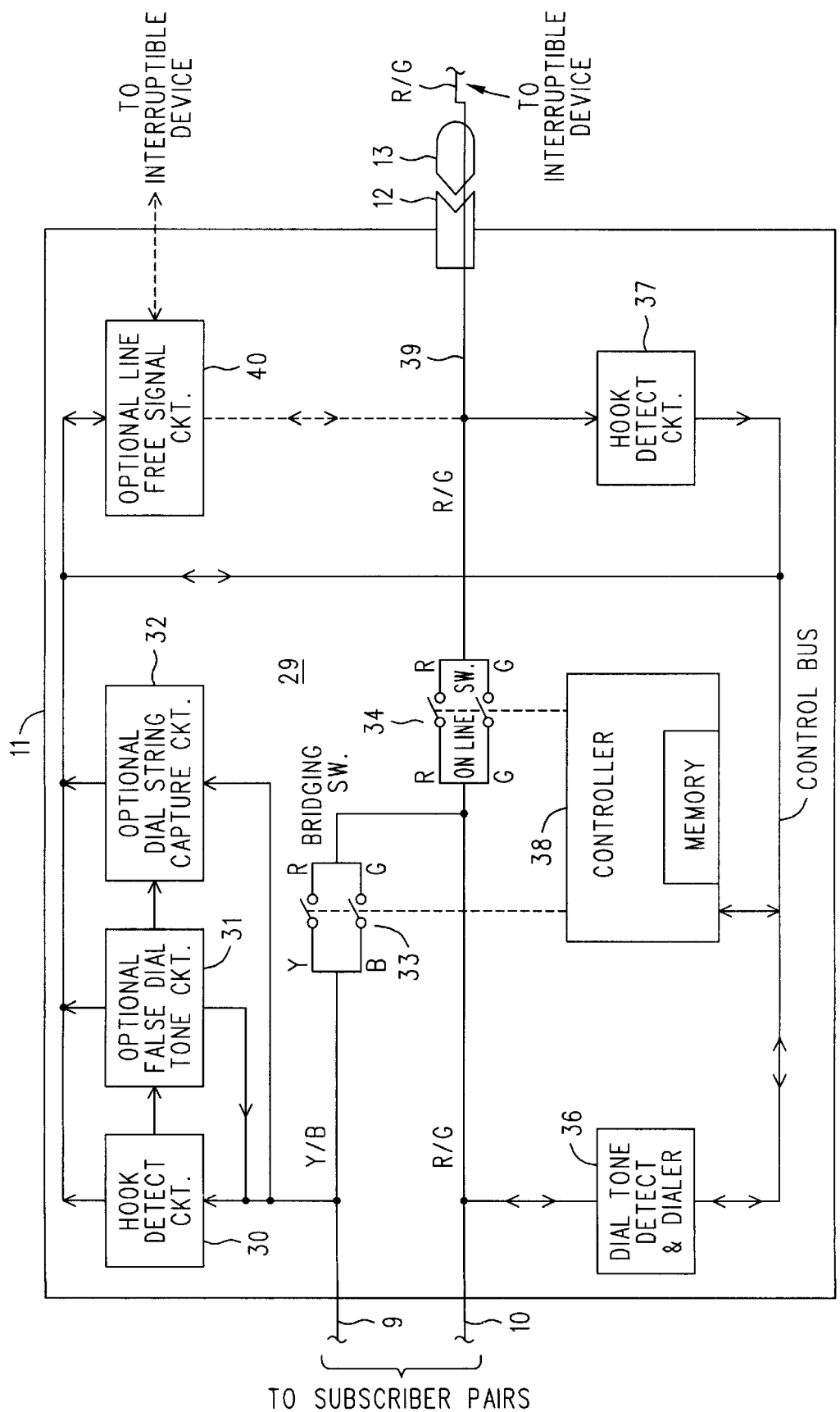
FIG. 2 is a simplified block diagram of a preferred embodiment of the phone line reallocation circuit of FIG. 1.

Now refer to FIG. 2, which is a more detailed, yet still simplified, preferred block diagram of re-allocation circuit 11. A hook detect circuit 30 (i.e., a circuit that determines if there is an off hook device on a pair, or whether all devices are on hook) is responsive to the on hook/off hook condition of Y/B pair 9. A similar hook detect circuit 37 is responsive to R/G pair 39, and is thus responsive to the on hook/off hook condition of the interruptible device. The two hook detect circuits are each coupled to a controller 38, which may be a microprocessor executing a program stored in a memory, or it may be an algorithmic state machine constructed of a PLA or a gate array. It is the algorithmic content of that programming that determines the response of the re-allocation circuit to various stimuli.

To continue, note "bridging" switch 33 and "on line" switch 34. These state of there switches determines what device is connected to the R/G pair 10/5 that is pair serviced by the telco. The state of these switches is determined by the controller 38, principally in response to the on/off hook conditions sensed by the hook detect circuits 30 and 37. In particular, if the Y/B pair 9 is on hook and the R/G pair 39 is on hook, then on line switch 34 is open, and bridging switch 33 bridges (i.e., is closed).

Now suppose that R/G pair 39 goes off hook, while Y/B pair 9/6 remains on hook. All that the controller 38 needs to do in response is open bridging switch 33 and then close on line switch 34. The interruptible device associated with R/G pair 39 is expected to do its own dial tone detection and subsequent dialing. In due course a telephone connection has been established, which is now subject to interruption upon detecting by hook detect circuit 30 that the Y/B pair 6/9 has gone off hook. It is at this juncture that the response can range from the simple to the more complex, depending upon what is desired and what resources are provided.

In the simplest case the response is to simply open on line switch 34, wait long enough for the central office to release the connection, and then close bridging switch 33. (The wait is needed, lest the person who picked up, say, phone 28 inherit the modem's end of a phone call that should have been terminated, but that wasn't.) This works, and the interrupted system may tolerate it in the sense of not fatally crashing, and allowing a subsequent recovery. It may even tolerate it as well as more graceful episodes involving notification, but it is still reminiscent of a meat axe.

It might be agreed that the threshold condition for interruption is too low. Suppose someone bumps into phone 28 and accidentally knocks the handset out of the cradle. Suppose a child is playing with the phone. There may more off hook conditions than are intended to cause interruption. For example, a parent using the computer may wish that someone wanting to merely order a pizza or chat with a friend need to know a secret code before the interruption is permitted. The secret code would be a sequence of two or three digits, known only to the initiated. (Of course, the sequence 911 would be a publicly known secret code, which presumably will not be dialed unless truly needed.) Or it could be the case that real secrecy is not desired, and a simple "dial 9 to get out" carried over from typical office environments is sufficient. This prevents most accidental off hook conditions from causing interruption, is easy for most office oriented people to remember, and provides a natural signal to the re-allocation circuit to perhaps execute a more graceful disconnect of the computer 14 from the R/G pair 10/5 before opening on line switch 34, waiting, and then closing bridging switch 33. It make take one or two seconds for the person picking up phone 28 to get the telco dial tone. However, this might not be harmful, as those who dial nine to "get an outside line" are usually accustomed to a brief wait anyway.

Some persons, especially the young and adolescent, do not realize that the telco does not always provide a dial tone at the instant the phone is picked up, and start dialing even before they put the handset to their ear. It usually works, but not always. So they might be a bit annoyed if they were forced to wait a second or two, as would be needed with the simple approach described above. Consider instead that a false dial tone is provided to the unbridged Y/B pair 9/6 as soon as the off hook condition is detected on that line by hook detect circuit 30. Dial tone circuit 31 supplies the false dial tone. (This also keeps, say, a visiting Granny from thinking something is wrong with her daughter's phone.) As soon as any digit is dialed the false dial tone goes away, just as real dial tone does. A dial string capture circuit 32 senses the dialed digits and sends them to the controller 38, which stores them in its memory. If the digit string includes any needed "secret code" or is "9" or "911", then the phone number, phone number portion of the string, or the "911" is sent from the controller to a dial tone detection and dialer circuit 36, from where it is dialed to the central office as soon as telco dial tone is obtained.

A potentially awkward situation arises here if the user is slow to dial the phone number, or if he should continue to dial after some number of digits for a standard in-country long distance call. Some "alternate" long distance companies have access codes, for instance. In such a case the reallocation circuit recognizes that telco dial tone has been obtained (and you'd better use it before you get the howler), dials what digits it has seen so far, and then quickly closes the bridging switch 33 before any more digits are dialed, to let the user finish the string directly, as it were.

At this point the original telephone connection for the computer/modem 14 (or whatever that device is) has been terminated in favor of beginning a new one for any of devices 27–29. At some point the new connection is ended. This is detected by sensing the transition to both hook detect circuits indicating on hook. The re-allocation circuits's response is to open bridging switch 33. Any further action is conditioned on what features are desirable. For instance, the controller can easily distinguish between an interruption that has just now ended and an earlier instance of the interruptible device simply having hung up on its own, without there having been an interruption. (This is done by remembering previous states and detecting particular sequences thereof.) In the latter case (it hung up on its own) it may be sufficient to simply wait and respond to whoever picks up first in the future. If that is the interruptible device, well, then it gets the phone line to the central office.

On the other hand, if there was an interruption, or perhaps it is thought useful to do so in any case, the re-allocation circuit 11 can signal that the phone line to the central office is free. The controller 3 8 would initiate this. The signal itself could include (or might simply be) an indicator lamp, ringing into to the modem to pass a message, inclusion of certain packets in network traffic over a LAN connection to the computer, or even activity on some other dedicate I/O channel between the re-allocation box and the computer. It is to support these types of notifications that we have shown the optional "line free" signaling circuit 40.

I claim:

1. A method of sharing a single telephone connection to a central office, the method comprising the steps of:

(a) coupling a first device to a primary pair of conductors from a demarcation box;

(b) establishing a first telephone connection between the first device and a central office;

(c) coupling a second device to a secondary pair of conductors from the demarcation box;

(d) monitoring the secondary pair of conductors to detect an off-hook condition of the second device;

(e) in response to detecting an off-hook condition in step (d), terminating the first telephone connection and uncoupling the first device from the primary pair of conductors;

(f) subsequent to step (e), coupling the secondary pair of conductors to the primary pair of conductors; and (g) subsequent to step (f), establishing a second telephone connection between the second device and the central office.

2. A method as in claim 1 further comprising the steps of:

(h) subsequent to step (f), monitoring the primary pair of conductors to detect an on-hook condition in the second device; and (i) in response to detecting an on-hook condition in step (h), uncoupling the secondary pair of conductors from the primary pair of conductors.

3. A method as in claim 2 further comprising the step of subsequent to step (i), automatically re-coupling the first device to the primary pair of conductors.

4. A method as in claim 2 wherein step (e) includes the step of signaling the first device that first telephone connection is about to be terminated, and further comprising the steps of:

(j) subsequent to step (i), automatically re-coupling the first device to the primary pair of conductors; and (k) signaling the first device that its telephone connection to the central office has been re-established.

5. A method as in claim 1 wherein steps (a) and (c) are accomplished with an adapter having a plug that mates with RJ-11 jacks and a jack that mates with RJ-11 plugs, the primary pair of conductors is the red/green pair, the secondary pair is the yellow/black pair, and the adapter couples the yellow/black contact positions on its plug side to the red/green contact positions on its jack side.

6. A method as in claim 1 wherein step (d) includes the subsequent detection of the dialing with the second device of a selected sequence of at least one digit in length, and the terminating of the first telephone connection of step (e) is conditioned upon the subsequent detection in step (d).

7. A method as in claim 1 wherein step (f) further includes supplying, until step (g), a false dial tone to the second device via the secondary pair of conductors.

8. A method as in claim 7 wherein digits dialed with the second device prior to step (g) are stored in a memory and step (g) includes dialing those digits.

* * * * *